United States Patent [19]
Wilson

[11] Patent Number: 4,930,392
[45] Date of Patent: Jun. 5, 1990

[54] BALLISTIC STREAM ELECTRICAL STUNNING SYSTEMS

[76] Inventor: John R. Wilson, 637 Totman Ct., Patterson, Calif. 95363

[21] Appl. No.: 366,600

[22] Filed: Jun. 15, 1989

[51] Int. Cl.$^5$ .................... F41B 15/00; F41H 13/00
[52] U.S. Cl. ........................................ 89/1.11; 89/1.1
[58] Field of Search .................................. 89/1.11, 1.1

[56] References Cited

U.S. PATENT DOCUMENTS

| | | | |
|---|---|---|---|
| 3,374,708 | 3/1968 | Wall | 89/1.11 |
| 3,880,569 | 4/1975 | Bannister et al. | 89/1.11 |
| 3,971,292 | 7/1976 | Paniagua | 89/1.11 |

Primary Examiner—David H. Brown
Attorney, Agent, or Firm—Harry E. Aine

[57] ABSTRACT

Electrical stunning systems are disclosed which employ one or more electrically conductive ballistic streams for contacting an unauthorized subject to complete an electrical circuit over which is administered the dose of stunning energy. Various sensors sense unauthorized entry and initiate commands and/or delivery of the dose of stunning energy. A volume control limits the amount of conductive liquid dispersed per dose of stunning energy. A continuity detector assures completion of the electrical circuit to the subject before applying the stunning energy. A range finder determines the length of the ballistic stream and adjusts the stunning power to compensate for losses in the ballistic stream. A functional tester tests for and indicates the operational readiness of the system. Viscosity increasing, surfactant and ionic additives to the aqueous solution improve the ballistics, wetting ability and conductivity of the ballistic stream and facilitate, inter alia, clean up of the spent stream material. Anti-theft, anti-intrusion, anti-skyjacking, and riot control systems are disclosed.

28 Claims, 4 Drawing Sheets

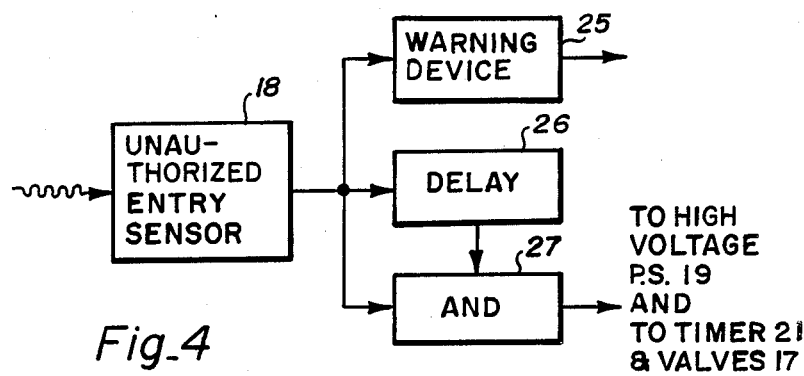
Fig_4
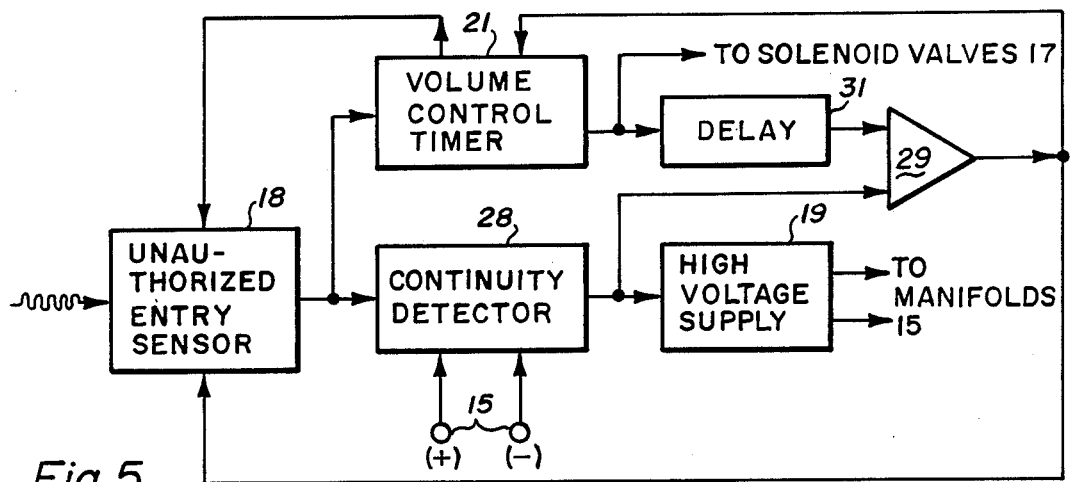
Fig_5
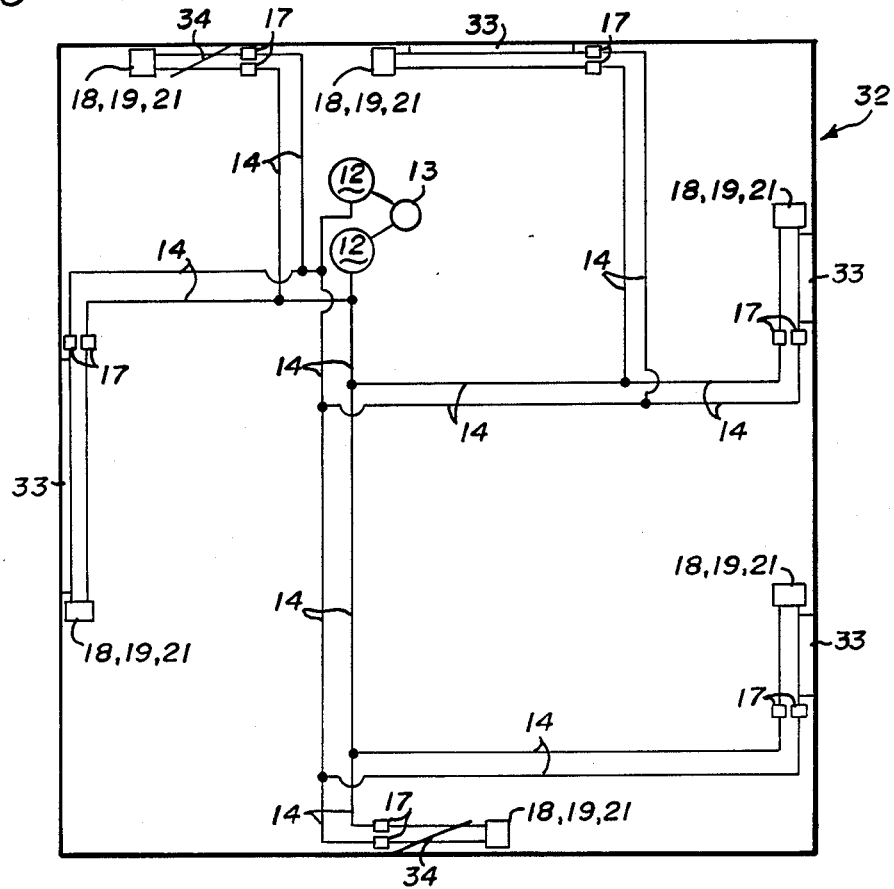
Fig_6

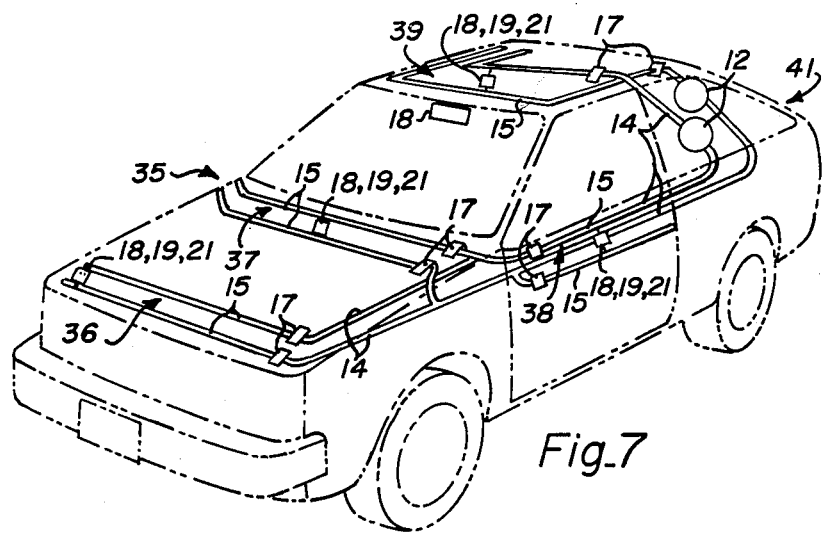
Fig_7
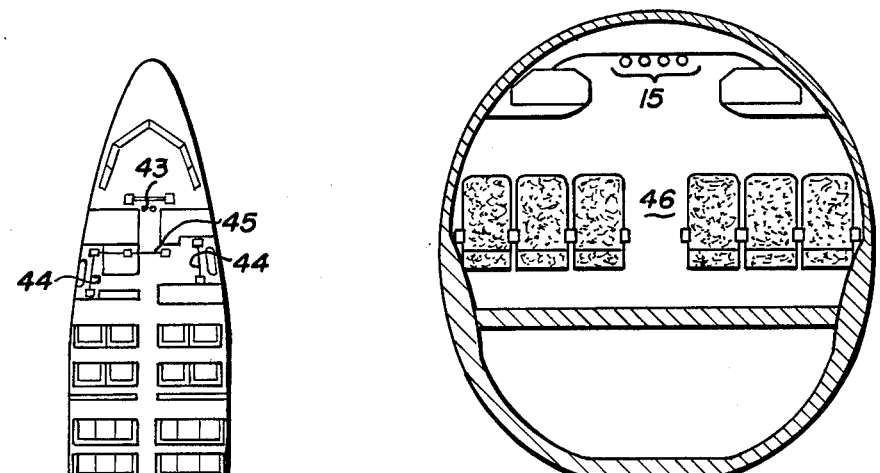
Fig_9
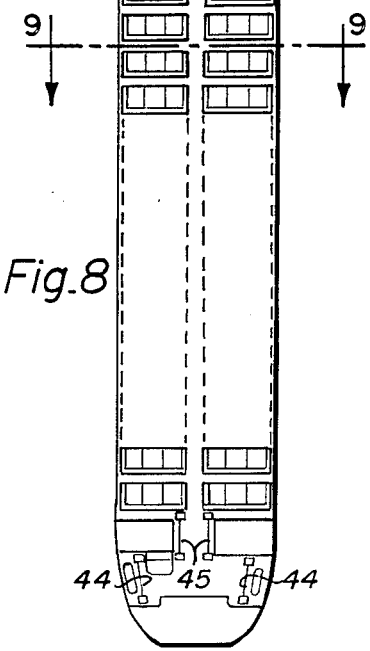
Fig_8
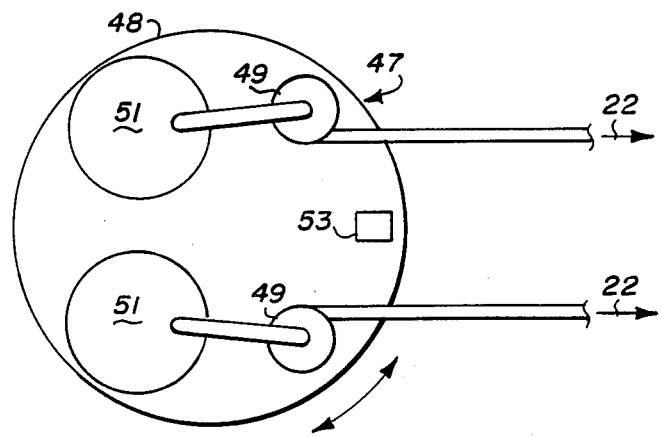
Fig_10

BALLISTIC STREAM ELECTRICAL STUNNING SYSTEMS

BACKGROUND OF THE INVENTION

The present invention relates, in general, to improved ballistic stream electrical stunning systems and, more particularly, to such systems useful for stunning intruders, unauthorized personnel, rioters, and the like.

DESCRIPTION OF THE PRIOR ART

Heretofore, double barrelled anti-personnel weapons have been proposed which project a pair of parallel ballistic streams of conductive liquid. The streams are maintained at different electrical potentials so as to complete an electrical circuit when the streams contact a subject for stunning the subject. Such weapons are disclosed in U.S. Pat. Nos. 3,971,292 and 3,374,708.

Stun guns which shoot out a pair of darts on wires connected to a source of stunning potential are disclosed in U.S. Pat. No. 3,523,538.

Various anti-theft and anti-intrusion systems are well known in which a sensor senses the intrusion and automatically notifies authorities and/or sounds an alarm.

It would be desirable to have an anti-theft and/or anti-intrusion system which would sense the unauthorized entry and stun the intruding subject, immobilizing same, for subsequent ease of apprehension by authorities.

SUMMARY OF THE PRESENT INVENTION

The principal object of the present invention is the provision of improved ballistic stream electrical stunning systems particularly useful for anti-theft, antiintrusion, riot control, and apprehension purposes.

In one feature of the present invention, one or more ballistic streams of conductive fluid, for carrying a stunning potential, are projected onto a subject to be stunned in response to a sensed unauthorized entry, whereby unauthorized subjects are stunned and/or deterred.

In another feature of the present invention, electrical continuity of the completed stunning electrical circuit including the ballistic stream portion is sensed before administering the dose of stunning voltage and current to the stream contacted subject, whereby electrical power is conserved.

In another feature of the present invention, a range finder senses the position of the subject and the power applied over the ballistic stream is controlled so as to compensate for stream length dependent resistive losses, whereby the stunning dose of power is rendered less sensitive to variations in the length of the ballistic stream to the subject.

In another feature of the present invention, the stunning dose of electrical power is administered to the subject in response to sensing of unauthorized movement of the subject, whereby the subject can be held to a certain area for ease of apprehension or caused to exit a certain area, as desired.

In another feature of the present invention, a warning and/or order is given to the intruder under threat of delivery of a dose of stunning power, whereby control over the intruder is facilitated.

In another feature of the present invention, the volume of conductive fluid dispensed in the ballistic stream, per administered dose of stunning energy is controlled so as to conserve the supply of conductive fluid.

In another feature of the present invention, a surfactant is incorporated into the liquid ballistic stream so as to facilitate making electrical contact to the subject.

In another feature of the present invention, a thixotropic agent is incorporated into the liquid ballistic stream so as to improve the ballistic characteristics of the stream and/or facilitate clean up of the dispensed fluid.

In another feature of the present invention, various parameters of the electrical stunning system, such as fluid pressure, fluid supply, operating voltage, etc are tested and the results indicated to provide an indication of the operational readiness of the stunning system.

In another feature of the present invention, various elements of the stunning system are disguised to avoid alerting the unauthorized subject to their presence.

Other features and advantages of the present invention will become apparent upon a perusal of the following specification taken in connection with the accompanying drawings wherein:

BRIEF DESCRIPTION OF THE DRAWINGS

FIG. 4 is a schematic circuit diagram, in block diagram form, of a portion of the circuit of FIG. 1 and depicting an alternative embodiment of the present invention, FIG. 5 is a circuit diagram similar to that of FIG. 4 depicting an alternative embodiment of the present invention, FIG. 6 is a plan view of a building depicting the installation of a stunning system incorporating features of the present invention, FIG. 7 is a perspective view of an automobile depicting the installation of a stunning system of the present invention, FIG. 8 is a plan view of the cabin of an aircraft depicting the installation of a stunning system of the present invention, FIG. 9 is a sectional view of the structure of FIG. 8 taken along line 9—9 in the direction of the arrows, FIG. 10 is a schematic plan view of a riot control system incorporating features of the present invention.

DESCRIPTION OF THE PREFERRED EMBODIMENTS OF THE INVENTION

Figure 1:
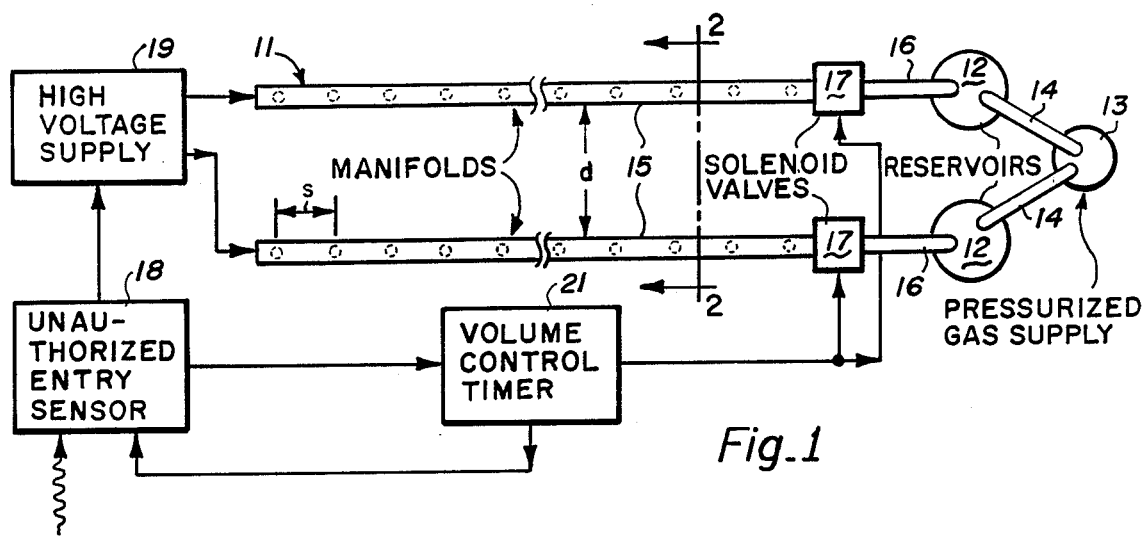
FIG. 1 is a schematic diagram, partly in block diagram form, of an electrical stunning system incorporating features of the present invention.
Figure 2:
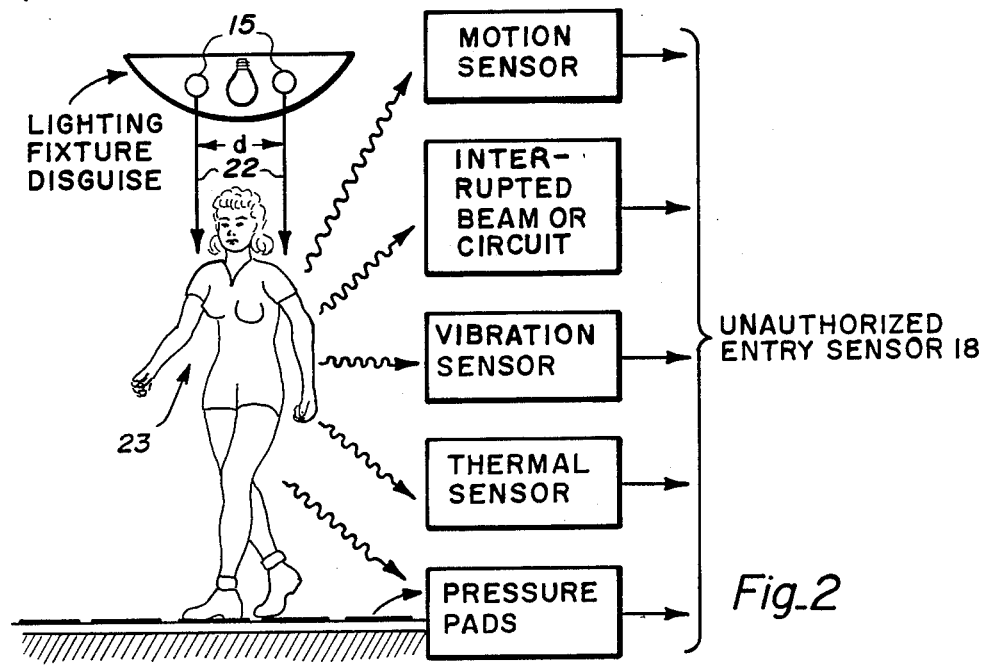
FIG. 2 is sectional view of the structure of FIG. 1 taken along line 2—2 in the direction of the arrows.

Referring now to FIGS. 1 and 2 there is shown an anti-theft and/or anti-intrusion system 11 incorporating features of the present invention. An electrically conductive fluid, such as tap water, is contained in a pair of reservoirs 12 pressurized from a supply of pressurized gas 13, such as $CO_2$, via supply lines 14. The pressurized conductive fluid is fed from the reservoirs to a pair of perforated, electrically conductive manifolds 15 via electrically insulative tubes 16 and solenoid valves 17.

An unauthorized entry sensor 18, comprising, for example, one or more sensors selected from the group consisting of, thermal sensor, motion sensor, interrupted beam or circuit sensor vibration sensor, or pressure pad sensors, senses unauthorized entry of a subject and gives a unauthorized entry output to a high voltage supply 19 and to a volume control timer 21, respectively.

The volume control timer 2 outputs an enabling voltage to the solenoid valves 17 for a sufficient time to dispense a certain predetermined volume of the conductive fluid from the reservoirs 12 through the manifold 15. The conductive fluid is squirted from each of the pair of manifolds 15 as a set of parallel ballistic streams 22.

The manifolds 15 are spaced apart by a distance, d, sufficiently close so that the subject 23 will be contacted by a ballistic stream emanating from different manifolds 15 and sufficiently far apart so that a ballistic stream 22 from one manifold 15 does not short out to a ballistic stream 22 from the other manifold 15.

In a typical example for the illustrated embodiment of FIGS. 1 and 2, d, is 2-3 inches and the stream defining holes or nozzles in the respective manifolds 15 are spaced apart by a distance ,s, so that the subject 23 will be contacted by one or more pairs of ballistic streams 22 from different manifolds 15.

The output of the high voltage power supply 19 is applied across the manifolds 15. In a typical example, the high voltage output is at least 40,000 V, modulated at a frequency of 3 to 30 Hz, and delivers a dose of energy to the subject of less than 0.5 joules over the ballistic streams 22. The ballistic streams 22 are at the potentials of their respective manifolds 15.

After the predetermined dose of stunning energy has been administered to the subject 23, the volume control timer outputs a disabling signal to the unauthorized entry sensor 18 to disable the sensor 18 and the high voltage supply 19 for a predetermined period of time and to reset the system 11.

Figure 3:
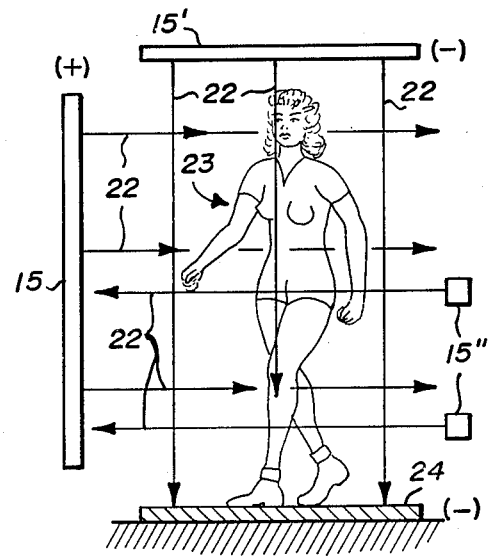
FIG. 3 is a view similar to that of FIG. 2 depicting alternative embodiments of the present invention.

Referring now to FIG. 3 there is shown an alternative embodiment to the arrangement of manifolds 15 in FIG. 1 and FIG. 2. In this embodiment, the manifolds 15 and 15' are angularly disposed to each other, such as by 90°, to reduce the probability of an unwanted short between the ballistic streams 22 which emanate from different manifolds 15, particularly shorts at the terminus of the ballistic streams where they may strike a common structure, such as the floor, wall, ceiling or the like.

In addition, FIG. 3 illustrates still another alternative embodiment to the structure of FIG. 1 and 2, namely, the provision of an electrode 24 in lieu of one of the manifolds 15'. The electrode 24, preferably in the form of a grid imbedded in a floor mat, floor runner, carpet, or the like, makes contact to the subject 23. The manifold 15 or 15" squirts the streams 22 of conductive fluid over and across the electrode 24, in non-contacting relation therewith, for completing the electrical circuit from the power supply 19 to the subject 23 and allowing the stunning dose of energy to be administered to the subject 23.

Referring now to FIG. 4 there is shown an alternative embodiment of the present invention for holding the unauthorized subject 23 in a certain area or for causing the subject 23 to exit the area. More particularly, system 11 is essentially the same as that of FIGS. 1 and 2 except that one output of the unauthorized entry sensor 18 is fed to a warning device 25, such as a tape player and speaker or integrated circuit memory with voice synthesizer chip, for playing a precorded message to the intruder 23.

The message, in one embodiment, orders the intruder to stay motionless. A motion sensing output of the sensor 18 is fed to a delay 26 which allows time for the intruder to heed the message. The motion sensing output is ANDED in AND gate 27 with the delayed output of delay 26. If the motion of the intruding subject, as sensed by the motion sensor 18, has not ceased upon the delay, an enabling output of the AND gate is fed to the high voltage power supply 19 and to the volume timer 21 and solenoid valves 17 for administering a stunning dose of energy to the subject 23.

The message, in a second embodiment, orders the intruding subject to exit the area. A pressure pad sensor, thermal sensor, or interrupted beam/circuit sensor 18 output is fed to the AND gate 27 and to the delay 26. If the subject has not exited the area, as sensed by the sensor 18, within the delay time, the output of the AND gate 27 causes a dose of stunning energy to be administered to the unauthorized subject.

Referring now to FIG. 5 there is shown an alternative embodiment of the present invention. This embodiment is the same as that of FIGS. 1 and 2 with the exception that an electrical continuity detector 28 is connected across the manifolds 15 or manifold 15 and electrode 24 (FIG. 3). The output of the continuity detector 28 enables the high voltage supply 19 when continuity is detected of the completed electrical circuit through the ballistic streams 22 or stream 22 and electrode 24 and the unauthorized subject. A second output of the continuity detector 28 is anded in AND gate 29 with an output of the volume control timer 21, as delayed by delay 31, to produce a disabling output fed back to reset the unauthorized entry sensor 18 and the vogue control timer if the electrical continuity has not been sensed at the end of the delay time of delay 29.

The continuity detector 28 reduces wear and tear on the high voltage power supply 19 and the delay 29 and AND gate 31 serves to conserve the supply of conductive fluid.

Referring now to FIG. 6 there is shown the installation of an anti-intruder stunning system 11 of the present invention for protecting a building 32. The building 32 includes a number of windows 33 and doors 34. The high voltage supplies 19, solenoid valves 17, manifolds 15 or manifold 15' or 15" and electrode 24 together with the appropriate entry sensors 18 are strategically located adjacent each of the respective doors 34 and windows 33. Common pressurized reservoirs 12 are connected in fluid communication with their respective manifolds 15 via electrically insulative tubes 14.

Referring now to FIG. 7, there is shown the installation of an anti-intruder stunning system 11 of the present invention for protecting an automobile 35. The manifolds 15 are strategically located adjacent areas to be protected, such as inside the hood 36, under the dash 37, along the inside of the drivers door 38, and overhead in the driver and passenger compartment 39. Common conductive liquid pressurized reservoirs 12 are located in the trunk 41 and are connected in fluid communication with the respective manifolds 15 via flexible electrically insulative high pressure tubing 14.

Appropriate unauthorized entry sensors 18 together with high voltage power supplies 19, volume timers 21, and solenoid valves 17 are located with each set of manifolds 15. The power supplies 19 include their own batteries recharged from the main battery of the vehicle. The sensors 18 are conveniently energized through a common switch, such as a door lock switch, for disabling the system. In addition, the electrode 24 of FIG. 3 is conveniently employed in the driver's seat for a one ballistic stream system.

Referring now to FIGS. 8 and 9 there is shown the installation of an anti-intruder/hijacker stunning system 11 of the present invention for protecting passenger aircraft 42. The manifolds 15 or manifolds 15 and electrode 24 are strategically positioned adjacent critical areas, such as the entrance 43 to the pilots compartment, each access door 44, and lavatory doors 45. In addition, manifolds 15 run overhead lengthwise of the aisleway 46.

Each of these manifold systems is self contained with pressurized reservoirs 12, high voltage power supplies 19, rechargeable batteries and is connected to a central control system that allows manual operation of the units 11, individually or simultaneously.

Figure 11:
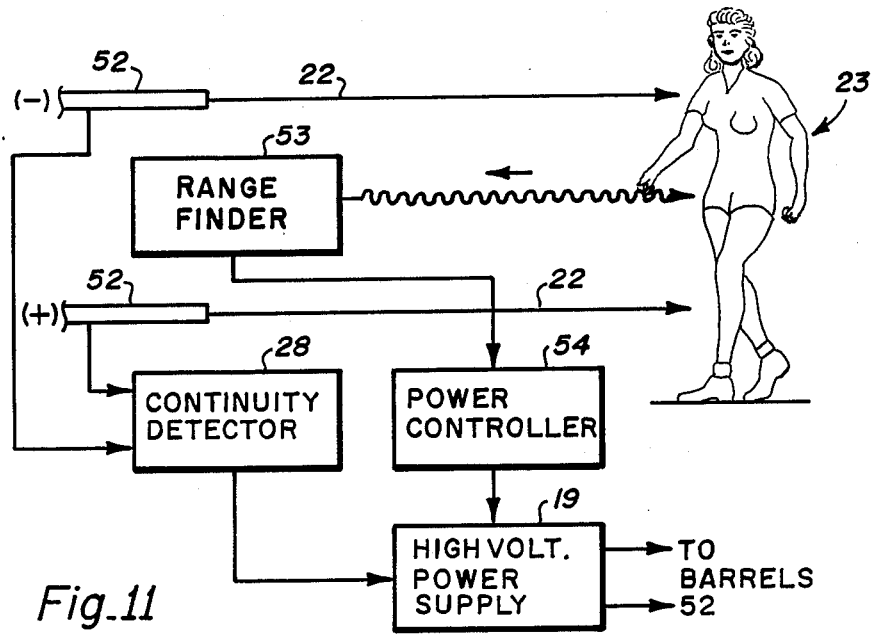
FIG. 11 is a schematic circuit diagram, partly in block diagram form, of the system of FIG. 10.

Referring now to FIGS. 10 and 11 there is shown a riot control stunning system 47 of the present invention. The system 47 includes a turret 48 mounted on a suitable armored vehicle, such as a tank, not shown. The turret 48 includes a pair of high pressure high volume pumps 49 energized under control of the operator.

The pumps 49 draw a conductive liquid from respective reservoirs 51 and push the liquid at high velocity through respective barrels 52 to form a pair of ballistic stream 22. A continuity detector 28 senses completion of the electrical circuit between the streams 22 and the subject 23 and supplies a continuity output to the high voltage power supply 19 for enabling same.

A range finder 53 such as an ultrasonic distance and position measuring device commercially available as model UDM-MUXP from Contaq Tech.Corp. of Bristol, Vt. or model E3JK from Omron of Schaumburg, Ill., measures the distance to the subject 23 and gives an output representative of the measured distance. The range finder 53 preferably also includes a control unit which takes the measured range output and calculates or looks up the resistance of the streams 22, which is a function of their length, i.e., measured range. The range finder output is then this signal which is a function of the resistance of the streams to the subject 23. The range output signal is fed to power controller 54 which adjusts the output power of the high voltage power supply 19 to compensate for the resistive losses of the ballistic streams 22 to the subject such that a uniform stunning dose of energy is administered to the subject independent of the range to the subject 23.

Figure 12:
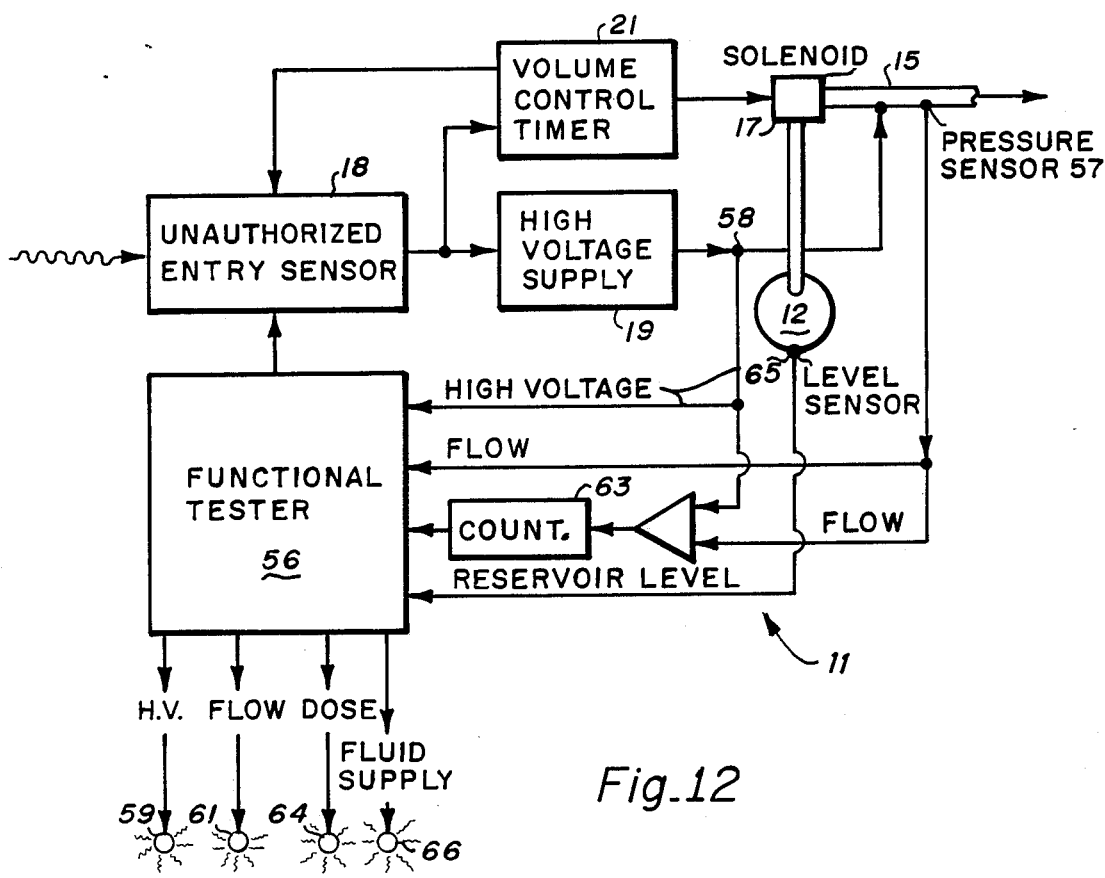
FIG. 12 is a schematic circuit diagram, partly in block diagram form, depicting a functional testing feature of the present invention.

Referring now to FIG. 12 there is shown an electrical stunning system 11 of the present invention incorporating an operational readiness test and indicator function. More particularly, a functional tester 56 in response to a manual or automatic input, outputs a test signal to the unauthorized entry sensor 18 to enable the sensor 18 and to cause it to output an unauthorized entry output to the high voltage supply 19 and to the volume control timer 21.

A pressure sensor 57 is connected into the manifold 15 to derive a pressurized output when the manifold 15 is pressurized with conductive fluid, indicative of flow for the streams 22. The high voltage output from the high voltage power supply 19 is sampled at 58. Portions of both the sampled high voltage and flow signals are fed back to the functional tester 56 to drive respective indicator lamps 59 and 61 for indicating operational readiness of the high voltage and flow.

Other portions of the sampled high voltage and flow signals are anded in an AND gate 62 and the result counted in a counter 63. If the count falls within a predetermined range, an output is fed to the functional tester 56 and used to drive indicator lamp 64 giving an indication that the administered stunning dose of energy is within specifications.

A fluid level sensor 65 is located in the reservoir 12 for sensing whether the liquid stored in the reservoir is above a certain level and for outputting a safe level signal. The safe level output is fed back to the functional tester 56 for driving a fluid supply level indicator lamp 66.

In a typical physical realization of the aforedescribed stunning system, the reservoir 12 or reservoirs, valves 17, conductive tubing, pumps 49 and manifolds 15 are electrically insulated, as by potting, to prevent shorting between such elements or from such elements to other structure. Such elements will take on the electrical potential of the respective streams 22 because the fluid is electrically conductive. The pressurized reservoirs 12, nozzles, and manifolds 15 are typically made of stainless steel or aluminum to withstand the pressure and corrosive effects of the conductive fluid.

The conductive fluid typically comprises an aqueous solution containing an ionic material such as NaCl. In addition, the fluid preferably includes a surfactant to promote wetting of the subject 23 by the contacting stream 22. Moreover, the fluid preferably includes a viscosity increasing agent for holding the stream 22 together over greater distances, thereby reducing spray and improving the ballistic character of the stream 22. Thixotropic agents are particularly suitable additives for the conductive liquid as they will serve to increase the viscosity of the liquid in the ballistic streams 22 and the spent ballistic stream liquid will turn to a gell to facilitate clean up, as by vacuuming, thereby reducing water damage. This is a particularly desired result for certain applications such as for use inside homes, aircraft and automobiles.

Suitable viscosity increasing agents include: (1) Polyethylene glycols such as Carbowax ® 540 blend or Carbowax ® 3350 commercially available from Union Carbide of Long Beach, Calif. (2) Polypropylene glycols, such as polypropylene glycol 425, commercially available from Dow Chemical. These viscosity increasing agents, some of which are thixotropic agents, are effective in the concentration range of 2 to 30% by weight of the aqueous solution. Some of these viscosity increasing agents also serve as surfactants as well as serving as antifreeze constituents for the liquid, as stored in the reservoir.

Suitable surfactant additives for the conductive fluid are preferably ionic and include the sodium based detergents, such as sodium lauryl sulfate, sodium heptadecy sulfate, Silwet ® L-7602 (a polyalkylene oxide modified polymethyl siloxane) commercially available from Union Carbide of Long Beach, Calif. These surfactants are useful in concentrations of 0.01% to 5% and preferably 0.1% to 3% by weight of the aqueous solution.

In certain applications the stunning system is preferably hidden and/or disguised from the unauthorized subject 23. Such installations would include those in passenger aircraft, automobiles, homes, offices, and the like. In such cases, the system may be disguised, for example, as a lighting fixture (FIG. 2). In the case of a hand held system 11, the system may be disguised as or combined with a camera or radio. In an automobile interior, it is conveniently disguised as a radar detector, decorator trim, radio speaker or a light fixture.

The single ballistic stream stunning systems are useful where one contact to the subject is made through a groung plane or conductive mat. For example the riot control system of FIGS. 10 and 11, in an alternative embodiment, uses a single ballistic stream 22 and makes contact to the ground by an electrode riding in contact with the ground or by a conductive ballistic stream 22 directed onto the ground. In many of these single ballistic stream stunning systems of the present invention, one contact to the subject is a floor contact. The floor contact is disguised as a floor mat or runner dimensioned and used in conjunction with a physical barrier such that no access is possible without full contact to such floor mat, runner or the like.

In the various embodiments of the present invention, as abovedescribed, the various unauthorized entry sensors 18 are conveniently put under control of and interfaced to other elements of the system by means of a microprocessor in the conventional manner as is well known in the art. One suitable microprocessor is MIC 2000 commerially available from Partlow Corp.

The advantages of the present invention include the ability to deter, prevent, immobilize, subdue, and control unauthorized behavior of subjects without the use of lethal force and in some cases without the presence of an operator In addition, the thixotropic agents facilitate clean up of spent ballistic stream material while providing improved stream ballistic and anti-freeze functions.

What is claimed is:

1. In a method for stunning a subject, the steps of:
contacting the subject with a ballistic stream of conductive fluid forming a portion of the path length of a completed electrical circuit between the subject and a source of power of sufficient voltage and current to stun the subject;
detecting electrical continuity of the completed electrical circuit to produce a continuity output; and
applying the stunning voltage and current through the completed electrical circuit in response to the continuity output for stunning the subject.

2. The method of claim 1 wherein the step of contacting the subject with the ballistic stream of conductive fluid includes the step of contacting the subject with two ballistic streams of conductive fluid and applying the voltage across the two streams to complete the electrical circuit to the source of power of sufficient voltage and current to stun the subject.

3. The method of claim 1 including the steps of:
sensing the position of the subject to derive an output representative of the resistance of the electrical circuit completed through the ballistic fluid stream contacted subject; and
adjusting the power applied to the completed electrical circuit so as to compensate for the length dependent resistance of the ballistic fluid stream portion of the electrical circuit to the subject, whereby the stunning dose of voltage and current administered to the subject is rendered less sensitive to the length of the ballistic fluid stream to the subject.

4. The method of claim 1 including the step of incorporating a surfactant into the ballistic fluid stream to improve wetting of the subject by contact with the fluid stream.

5. In a method for automatically stunning intruders, the steps of:
automatically sensing when a subject has intruded into a certain predetermined area to be protected to produce ar intrusion output; and
applying a ballistic stream of conductive fluid into the protected area in response to the intrusion output for contacting the intruding subject and completing an electrical circuit between the intruding subject and a source of power of sufficient voltage and current to stun the intruding subject.

6. The method of claim 5 wherein the step of automatically sensing intrusion includes the step of:
sensing motion within the predetermined protected area to produce the intrusion output.

7. The method of claim 5 including the steps of:
detecting electrical continuity of the completed electrical circuit to produce a continuity output; and
applying the stunning voltage and current through the completed electrical circuit in response to the continuity output for stunning the intruding subject.

8. The method of claim 5 including the steps of:
warning the intruding subject not to move in response to the intrusion output;
sensing motion of the intruding subject subsequent to the warning to produce a motion output; and
enabling the application of the stream of conductive fluid to the intruding subject in response to the motion output.

9. The method of claim 5 including the steps of:
dispensing a predetermined volume of conductive fluid with each application of the ballistic stream of conductive fluid to the intruding subject, thereby conserving the use of the conductive fluid.

10. The method of claim 5 including the step of:
sensing the position of the subject to derive an output representative of the length of the electrical path through the conductive fluid ballistic stream to the subject; and
adjusting the power applied to the completed electrical circuit so as to compensate for the length of the fluid ballistic stream portion of the completed electrical circuit to the intruding subject, whereby the stunning voltage and current administered to the subject is rendered less sensitive to the length of the ballistic stream to the subject.

11. The method of claim 5 including the step of:
incorporating a surfactant into the ballistic stream to increase the wetability of the subject by the contacting fluid stream.

12. The method of claim 5 including the step of:
incorporating a viscosity increasing agent into the ballistic stream for holding the stream together to improve the ballistics of the stream over a greater distance.

13. The method of claim 5 including the steps of:
warning the intruding subject in response to the intrusion output; and
delaying the application of the ballistic stream of conductive fluid for a predetermined time sufficient to allow the intruding subject to exit the protected area.

14. The method of claim 13 wherein the step of warning the intruding subject includes the step of:
sounding a prerecorded message advising the intruding subject to exit the protected area.

15. In an apparatus for stunning a subject with a dose of electrical power applied to the subject from a power supply over a completed electrical circuit path including a conductive ballistic stream path portion:
- means for sensing the electrical continuity of the completed electrical circuit to derive a continuity output; and
- means for applying the stunning power through the completed electrical circuit in response to the continuity output for stunning the subject.

16. In an apparatus for stunning a subject with a dose of electrical power administered to the subject from a power supply over a completed electrical circuit path including a conductive ballistic stream path portion:
- ranging means for deriving a range output which is a function of the length of the ballistic stream path portion to the subject; and
- power control means responsive to the range output for adjusting the power applied to the completed electrical circuit to compensate for the length of the ballistic stream portion to administer a stunning dose of power to the subject which is rendered less sensitive to variation in the length of the ballistic stream portion.

17. In an apparatus for stunning a subject with a dose of electrical power administered to the subject from a power supply over a completed electrical circuit path including a conductive ballistic stream path portion:
- motion detector means for detecting motion of the subject and producing a motion output; and
- means responsive to the motion output for administering the stunning dose of electrical power over the completed electrical circuit to the subject for stunning same.

18. In an apparatus for stunning a subject with a dose of electrical power administered to the subject from a power supply over a completed electrical circuit path including a conductive ballistic stream path portion:
- squirt means for squirting the fluid onto the subject as a ballistic stream; and
- said ballistic stream of fluid comprising a liquid incorporating a surfactant for wetting the subject to improve the electrical contact thereto.

19. In an apparatus for automatically stunning intruders:
- sensing means for producing an intruder output when a subject has intruded into an unauthorized area; and
- squirting means responsive to the intruder output for squirting a ballistic stream of conductive fluid into the unauthorized area for electrically contacting the intruding subject and for completing an electrical circuit between the intruding subject and a source of power of sufficient voltage and current to deliver a stunning dose of voltage and current over the completed electrical circuit to stun the intruding subject.

20. The apparatus of claim 19 wherein said sensing means includes a motion sensor means for sensing motion of the intruding subject within the unauthorized area to produce the intruder output.

21. The apparatus of claim 19 including :
- continuity detector means for detecting continuity of the completed electrical circuit and producing a continuity output; and
- control means responsive to the continuity output for applying the stunning voltage and current through the completed electrical circuit to the intruding subject for stunning same.

22. The apparatus of claim 19 including:
- warning means responsive to the intrusion output for warning the intruding subject not to move;
- motion sensing moans for sensing motion of the subject intruder subsequent to the warning to produce a motion output; and
- enabling means responsive to the motion output for enabling the stunning dose of voltage and current to be delivered to the intruding subject over the completed electrical circuit.

23. The apparatus of claim 19 including:
- flow control means for controlling the volume of conductive fluid dispensed from said supply means as a squirted ballistic stream for each dose of stunning power administered to the intruding subject, whereby the conductive fluid is conserved.

24. The apparatus of claim 19 including:
- position sensing means for sensing the position of the intruding subject to derive a range output representative of the length of the electrical path through the ballistic stream to the intruding subject; and
- power control means responsive to the range output for adjusting the power applied to the completed electrical circuit so as to compensate for the length dependent resistive component of the ballistic stream to the intruding subject, whereby the stunning dose of power administered to the subject is rendered less sensitive to the length of the ballistic stream.

25. The apparatus of claim 19 including:
- testing means for testing the performance of at least one of the elements of the intruder stunning apparatus selected from the class consisting of stunning voltage, stunning current and ballistic stream to derive a test output; and
- indicator means responsive to the test output for indicating the operational readiness of the intruder stunning apparatus.

26. The apparatus of claim 19 including:
- disguise means for disguising said sensing and squirting means.

27. The apparatus of claim 19 including:
- warning means responsive to the intruding output for warning the intruding subject ; and
- delay means responsive to the intruder output for delaying the application of the stunning dose of voltage and current to allow sufficient time for the intruding subject to exit the unauthorized area.

28. The apparatus of claim 27 wherein said warning means includes;
- sounding means for sounding a prerecorded message advising the intruder to exit the unauthorized area.

* * * * *